United States Patent
Kumagai et al.

(10) Patent No.: US 8,249,516 B2
(45) Date of Patent: Aug. 21, 2012

(54) APPARATUS FOR AUTOMATICALLY SEPARATING AND DETECTING NOISE RADIO WAVES

(75) Inventors: Hideki Kumagai, Tokyo (JP); Takashi Kumagai, Tokyo (JP)

(73) Assignee: Hideki Kumagai, Tokyo (JP)

( * ) Notice: Subject to any disclaimer, the term of this patent is extended or adjusted under 35 U.S.C. 154(b) by 268 days.

(21) Appl. No.: 12/681,222

(22) PCT Filed: Aug. 29, 2008

(86) PCT No.: PCT/JP2008/065559
§ 371 (c)(1),
(2), (4) Date: May 10, 2010

(87) PCT Pub. No.: WO2009/066495
PCT Pub. Date: May 28, 2009

(65) Prior Publication Data
US 2012/0007671 A1    Jan. 12, 2012

(30) Foreign Application Priority Data
Nov. 19, 2007    (JP) .................. 2007-299198

(51) Int. Cl.
H04B 17/00    (2006.01)

(52) U.S. Cl. .................. 455/67.13; 455/63.1; 455/501; 455/220; 455/222

(58) Field of Classification Search .................. 455/570, 455/9, 23, 42, 46, 47, 48, 501, 504, 63.1, 455/67.13, 67.16, 76, 114.1, 114.2, 114.3, 455/104, 123, 135, 144, 222, 220, 226.3; 381/120; 375/260; 370/203; 330/124 R
See application file for complete search history.

(56) References Cited

U.S. PATENT DOCUMENTS

| | | | | |
|---|---|---|---|---|
| 5,223,795 A * | 6/1993 | Blades | .................. | 324/536 |
| 5,294,979 A * | 3/1994 | Patel et al. | .................. | 348/624 |
| 5,564,090 A * | 10/1996 | Beauchamp et al. | .................. | 455/220 |
| 5,634,198 A * | 5/1997 | Cameron et al. | .................. | 455/63.1 |
| 5,729,145 A * | 3/1998 | Blades | .................. | 324/536 |
| 6,272,089 B1 * | 8/2001 | Kato | .................. | 369/53.41 |
| 7,855,375 B2 * | 12/2010 | Kearfott | .................. | 250/484.3 |
| 8,111,778 B2 * | 2/2012 | Yano et al. | .................. | 375/296 |
| 2002/0171913 A1 * | 11/2002 | Batchko et al. | .................. | 359/333 |
| 2008/0017785 A1 * | 1/2008 | Byren | .................. | 250/214 R |
| 2008/0299932 A1 * | 12/2008 | Belogolovy et al. | .................. | 455/296 |
| 2009/0141911 A1 * | 6/2009 | Iwamatsu | .................. | 381/120 |
| 2010/0310086 A1 * | 12/2010 | Magrath et al. | .................. | 381/71.11 |

FOREIGN PATENT DOCUMENTS

| | | |
|---|---|---|
| JP | 54-133174 | 10/1979 |
| JP | 63-184088 | 7/1988 |
| JP | 3-60094 | 6/1991 |
| JP | 3188609 | 5/2001 |
| JP | 2004-28719 | 12/2004 |

* cited by examiner

*Primary Examiner* — Tan Trinh

(74) *Attorney, Agent, or Firm* — Jordan and Hamburg LLP

(57) ABSTRACT

An output signal SHS is secondarily amplified by a high-frequency amplifier AMP3 and an output signal SHR is secondarily amplified by an AMP4 for which high-frequency side amplitude reducing means is taken. In this case, the AMP4 has small gain of a high-frequency region and its output SHR-2 is reduced in amplitude. However, a high-frequency noise has a frequency higher than that of a carrier wave SH and the amplitude of a noise NzB becomes smaller. The other output signal SHS is directly amplified by the wideband amplifier AMP3. The width of an SHS-2 and the width of the SHR-2 are adjusted by amplitude adjusting means throughout the whole region and then mutually added by both signals addition amplifying means again so that the amplitude of the output signal SHS is adjusted to the SHR-2, and a predetermined threshold value is set to extract the noises.

9 Claims, 12 Drawing Sheets

FIG. 3
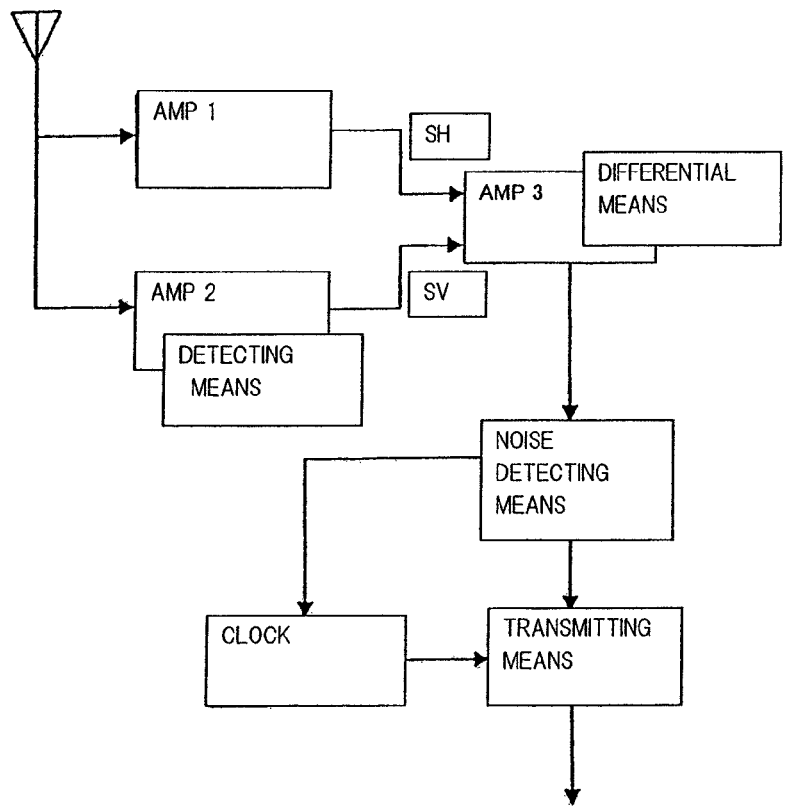
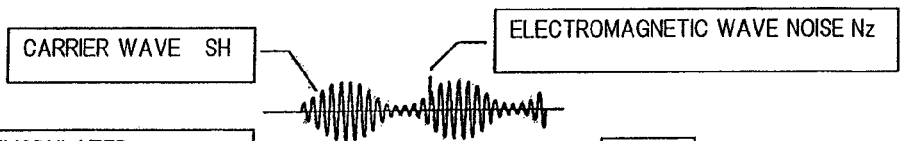
FIG. 4A
FIG. 4B
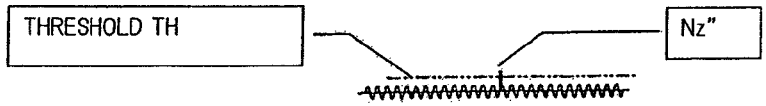
FIG. 4C

SHS-A (CASE WHERE PHASE SHIFT IS INCLUDED IN WAVEFORM OBTAINED BY LOWERING AMPLITUDE OF WAVEFORM OF FIG. 8 TO SAME LEVEL AS THAT OF FIG.10)

WAVEFORM WHERE PHASE SHIFT OF WAVEFORM OF FIG. 15B IS CORRECTED AND SUBTRACTED FROM WAVEFORM OF FIG. 15A

APPARATUS FOR AUTOMATICALLY SEPARATING AND DETECTING NOISE RADIO WAVES

BACKGROUND OF THE INVENTION

The present invention relates to an apparatus for detecting electromagnetic waves that are generated due to activity in the natural world. More particularly, the present invention relates to an apparatus for detecting a change of electromagnetic waves generated as a premonitory symptom of earthquakes.

By the movement of various plates constituting the earth crust of the earth, complicated stress occurs between the plates. In particular, Japan undergoes a large-scale earthquake regularly because of being located in the place where the plural plates interfere with each other, and gets into danger. From such a point of view, the prediction of the earthquake is extremely important and urgent. However, unfortunately, the earthquake prediction to specify the time and the place of the earthquake generation is not yet possible at the current science standard.

In regards to an earthquake prediction method based on the earthquake prediction or the observance of the electromagnetic waves or an observing method of electromagnetic waves in the natural world, some technologies have been suggested, as disclosed in the following documents.

Patent Document 1
Japanese Patent Application Laid-Open (JP-A) No. 63-184088
Patent Document 2
JP-A No. 54-133174
Patent Document 3
Japanese Utility Model Application Laid-Open (JP-U) No 03-060094
Patent Document 4
Japanese Patent No. 3188609

Among them, the inventions disclosed in Patent Documents 1 and 2 are directly related to the earthquake prediction. The invention disclosed in Patent Document 1 relates to a technology for predicting the earthquake by inserting an antenna into a deep well and measuring radio waves in the ground. The invention disclosed in Patent Document 2 relates to a technology for transmitting artificially transmitting radio waves and predicting generation of the earthquake based on abnormality of a reception state of the radio waves at a receiving side. However, uncertain elements are excessively large, and the prediction of the earthquake based on the specific time and place is impossible in actuality.

The invention disclosed in Patent Document 3 relates to a technology for mainly specifying a vibration source other than the earthquake or the seismic origin, rather than the prediction. Finally, the invention disclosed in Patent Document 4 is developed and patented by the present applicant. In this invention, for example, electromagnetic waves that are used as communication and broadcasting means of radio broadcasting are measured, components that are considered as noises generated from the natural world are extracted from the measured electromagnetic waves, and abnormality of the earth crust is estimated based on a change in the number of generation of the noises.

SUMMARY OF THE INVENTION

The present invention relates to improvement of the above-mentioned invention (apparatus for detecting and analyzing electromagnetic wave noises (hereinafter referred to as "old invention")) that is disclosed in Patent Document 4.

The old invention disclosed by the applicant constructs a system for automatically separating and detecting electromagnetic wave noises generated in the natural world, disposes the apparatuses at observation points of 36 places all over the country to detect the noises, and enables earthquake prediction with the relatively excellent probability.

However, in this system, the electromagnetic wave noises that functions as a predictor of the earthquake may not be sufficiently detected. As the determination result of the reason, all of the slight weak electromagnetic wave noises in the natural world cannot be securely detected in the configuration of the old invention.

In the electromagnetic waves of broadcasting and communication frequency bands subjected to AM modulation, in the case where the configuration where the noises are detected by a threshold hold at an amplitude level of received waves is adopted, it may become difficult to discriminate between the case where the noises do not exist and the signal amplitude is large and the case where the electromagnetic wave noises are received. As a result, reliability of noise detection data may be lowered.

Hereinafter, the configuration of the old invention and the problems to be resolved in the old invention will be described.

As illustrated in FIG. 1, in general, a received AM radio waveform becomes a modulated high frequency signal having a low-frequency envelope SL by modulating a high frequency carrier wave HC with a low frequency signal SV corresponding to a sound wave, and the modulated high frequency signal as a broadcasting wave SH is transmitted from a broadcasting station BC (also see FIG. 2).

In FIG. 2, electromotive wave noises NZ that are generated by underground distortion energy QE due to distortion stress in the ground are mixed with broadcasting radio waves SH, while the broadcasting wave SH is propagated from the broadcasting station BC to a radio receiver RD.

In the system for automatically separating and detecting the electromagnetic wave noises in the old invention, the electromagnetic wave noises NZ are separated and detected without depending on the magnitude of the broadcasting signal (or waveforms of the envelope). The specific configuration is as follows.

That is, as illustrated in a block diagram of FIG. 3, the system includes first high-frequency amplifying means AMP1 that amplifies the received AM radio waves SH with a high frequency, second amplifying means AMP2 for information signal reproduction that detects, amplifies, and smoothens the received radio waves of the high frequency and generates an information signal, and third high-frequency differential amplifying means AMP3 that differentially amplifies an output SH of the first high-frequency amplifying means and a demodulated output SV of the second amplifying means for information signal reproduction and constantly maintains an output level, regardless of the magnitude of the information transmission signal. When the high-frequency noises NZ (see FIG. 1) other than the information transmission signal SV are received, a function of constantly maintaining the output level is invalidated, and high-frequency noises NZ" (see FIG. 4) can be detected.

The configuration is specifically described using FIG. 4. The waveform SH (see FIG. 4A) that is obtained by amplifying the radio waves with the high frequency and an information signal waveform (see FIG. 4B) of a low frequency that is obtained by detecting, amplifying, and smoothening the received radio waves are mutually subtracted, and the high-frequency pulse noise that rarely appears at the low frequency side like NZ' illustrated in FIG. 4B is detected by making the high-frequency pulse noise distinctive like NZ" of FIG. 4C.

However, in this system, all of the pulse noises that are mixed with the broadcasting waves SH cannot be securely detected. Almost all the pulse noises that have sufficiently large amplitude can be detected. However, the noises that have small amplitude may not be detected according to a setting condition, such the threshold TH.

As illustrated in FIG. 5, the high-frequency noises generated from the natural world that are mixed with the broadcasting waves SH are not limited to noises (denoted by reference character NzA) on a place close to a peak of carrier waves. The high-frequency noises mainly exist on a portion of the side or base of carrier waves other than the peak as denoted by reference character NzB.

FIG. 6 illustrates an enlarged view of the case where the natural world noises exist on the peak of the carrier waves and the case where the natural world noises exist on the base of the carrier waves.

In the apparatus for detecting and analyzing the electromagnetic wave noises in the old invention, with respect to the broadcasting waves SH on which the high-frequency noises exist, a difference with the low frequency signal corresponding to the low-frequency envelope SL is taken, and the noise that protrudes by the protrusion amount exceeding the difference is detected. For example, like a noise NzA of FIG. 6, the noise that is received at the time close to the peak of the high frequency and the low frequency SL are subtracted, and only the protrusion portion remains. Therefore, the noise NzA is detected.

Meanwhile, even in the noise that exists on the base of the carrier waves, the noise having the amplitude that exceeds the low-frequency envelope can be detected. However, like the noise NzB of FIG. 6, the noise that has the amplitude smaller than the amplitude of the low-frequency envelope SL may be buried in the low frequency envelop SL, and cannot be detected. That is, a noise dead zone is generated in portions (shaded portions of FIG. 6) between valleys of the low frequency waveform and the high frequency waveform.

The present invention has been made to solve the problems in the old invention, and it is an object of the present invention to provide an apparatus that effectively extracts noises generated from the natural world.

That is, in order to easily and automatically separate and detect the noises generated from the natural world, a received high-frequency waveform of AM modulation is separated into two systems, independent processing is performed on the waveform of each system, and the waveforms of the two systems are subtracted, thereby making the high-frequency noise portions other than the signal waveforms distinctive to detect the noises. When the noises are detected, the low-frequency envelope is not used and only the high frequency processing is executed, and the portion corresponding to the "dead zone" is not generated. The noises can be automatically separated and detected, regardless of the generation time of the high-frequency noises, and the noises can be detected without depending on the magnitude of the amplitudes of the noises and in the very small amplitude theoretically.

According to the system in accordance with an aspect of the present invention, since the noises are detected by using only a high frequency amplification system without executing the low frequency amplification for the sound used in the automatic separation and detection of the electromagnetic wave noises in the old invention, the unstable phase variation due to the frequency difference of the high frequency and the smoothened low frequency can be avoided, and the noise detection disabled portion can be prevented from being generated due to the amplitude difference between the high frequency and the low frequency. As a result, the relatively weak noises can be detected, and the detection rate of the noises can be greatly improved. Accordingly, the high-precision noise separation and detection can be achieved.

BRIEF DESCRIPTION OF THE DRAWINGS

FIG. 3 is a block diagram illustrating the configuration of an apparatus for detecting and analyzing electromagnetic wave noises proposed by the inventors;

FIG. 4A-4C are conceptual diagrams illustrating a noise detection state in the apparatus of FIG. 3;

DETAILED DESCRIPTION OF THE INVENTION

According to an aspect of the present invention, with respect to a portion of a tuning frequency basically functioning as a carrier wave, regardless of the magnitude or the waveforms of low frequency modulation, the waveforms are almost completely cancelled. The present invention is not limited to be applied to only an AM modulation region, and can be applied to almost all frequency bands. Accordingly, an apparatus can be optimally disposed according to a disposition region and a disposition environment of the apparatus, and the noises can be detected at the same observation spot through plural frequency bands. As a result, the electromagnetic wave noises generated from the natural world can be detected with a high precision.

First Embodiment

Figure 1:
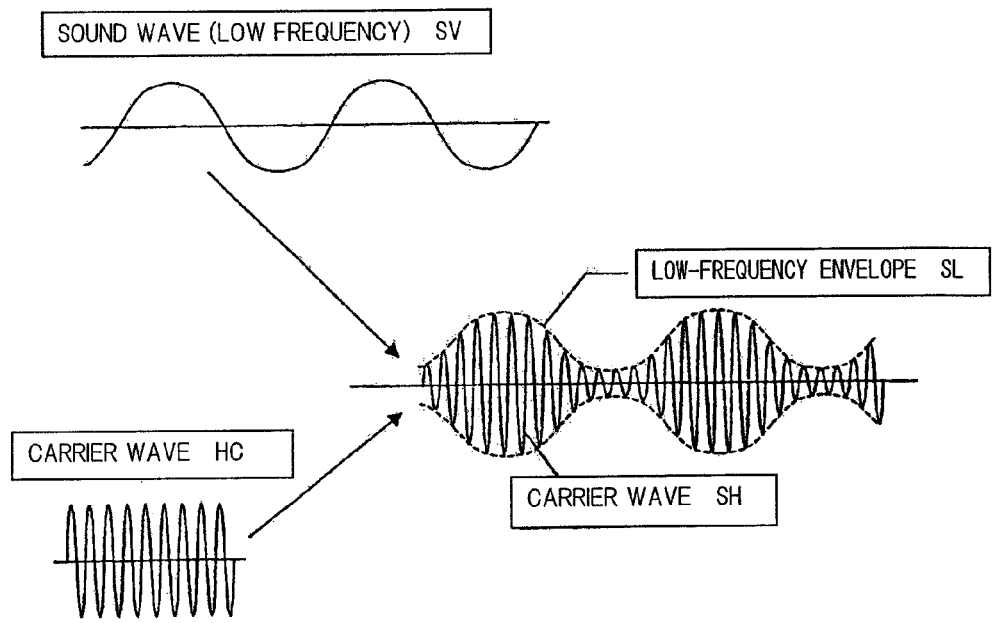
FIG. 1 is a schematic diagram illustrating a broadcasting wave where a carrier wave is modulated with a sound wave.
Figure 2:
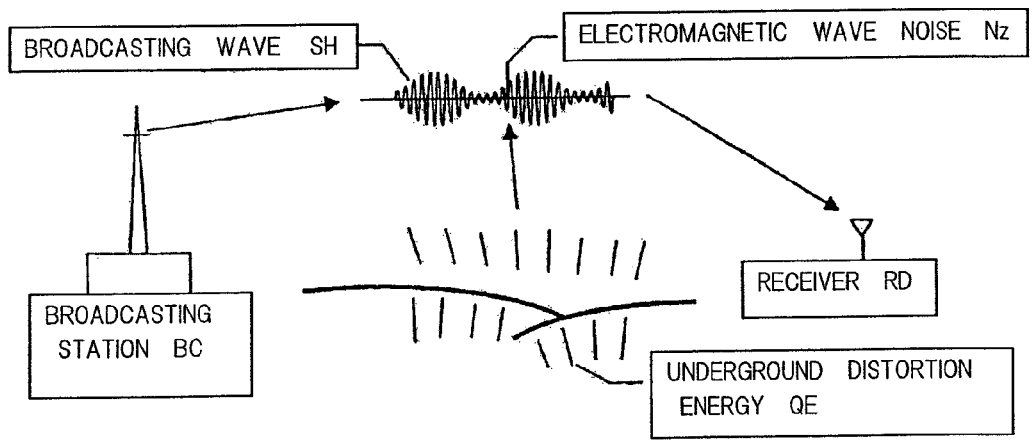
FIG. 2 is a diagram illustrating a state where electromagnetic waves generated from the natural world are mixed with the broadcasting wave.
Figure 5:
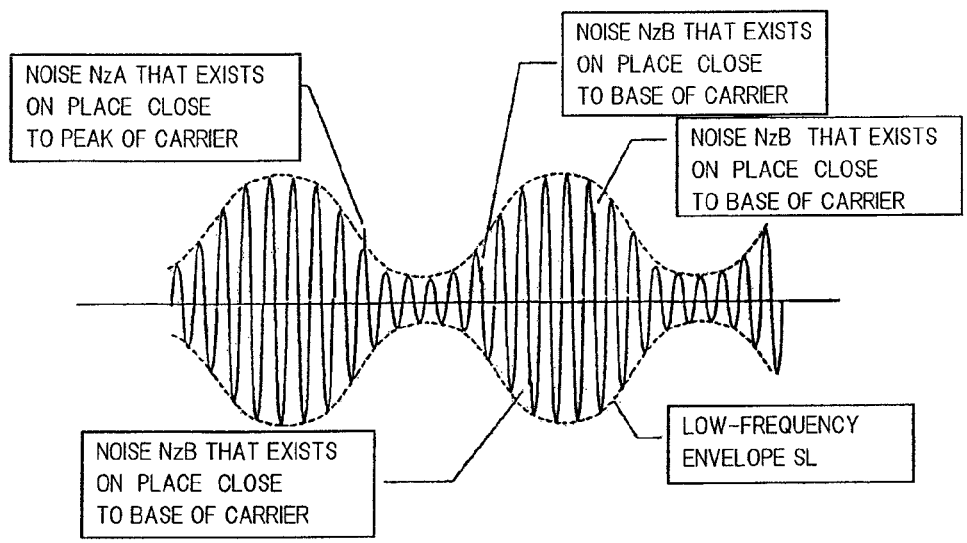
FIG. 5 is a conceptual diagram illustrating a waveform of a state where high-frequency noises exist on the broadcasting wave.
Figure 6:
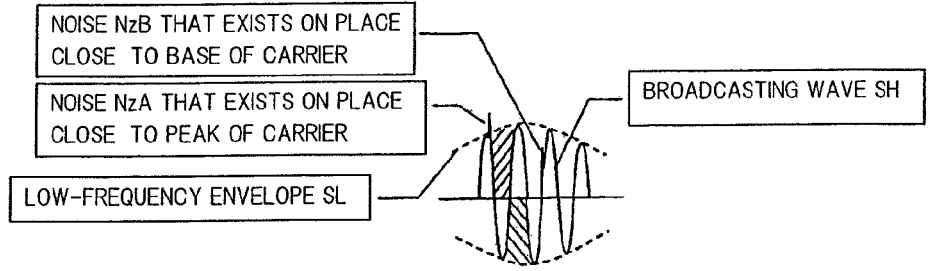
FIG. 6 is a partially enlarged view of FIG. 5.

The case where a high-frequency noise NzB illustrated in FIG. 5 or 6 is mixed with a high frequency carrier wave SH (broadcasting wave) subjected to low frequency modulation, such as a sound wave, SV as illustrated in FIG. 1 is considered.

Figure 7:
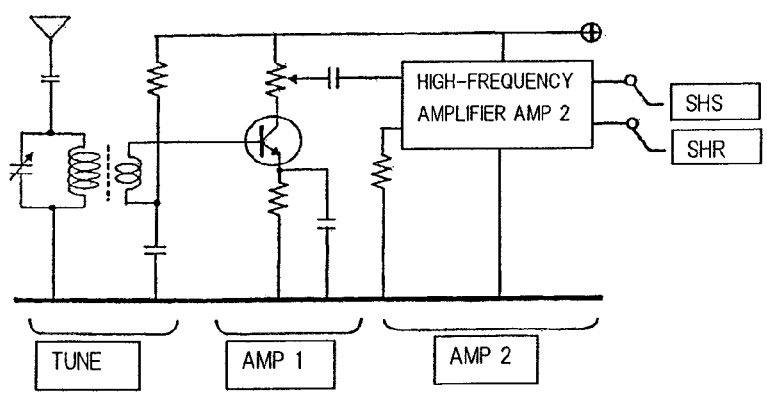
FIG. 7 is a diagram illustrating a configuration example of a circuit that constitutes an apparatus according to an aspect of the present invention.

In FIG. 7, the high frequency carrier waves SH are received by a tuning circuit TUNE to the frequency SH, a radio wave signal that is output by an initial stage amplifying circuit AMP1 is amplified by a high-frequency amplifying circuit having an inversion output, such as AMP2, and an output signal SHS of a regular output side and an output signal SHR of an inversion output side are obtained. If a balance of the output signals SHS and SHR is adjusted, the output signals SHS and SHR where the waveforms are inverted with the same waveforms can be obtained as illustrated in the waveforms of FIGS. 8 and 9.

Figure 8:
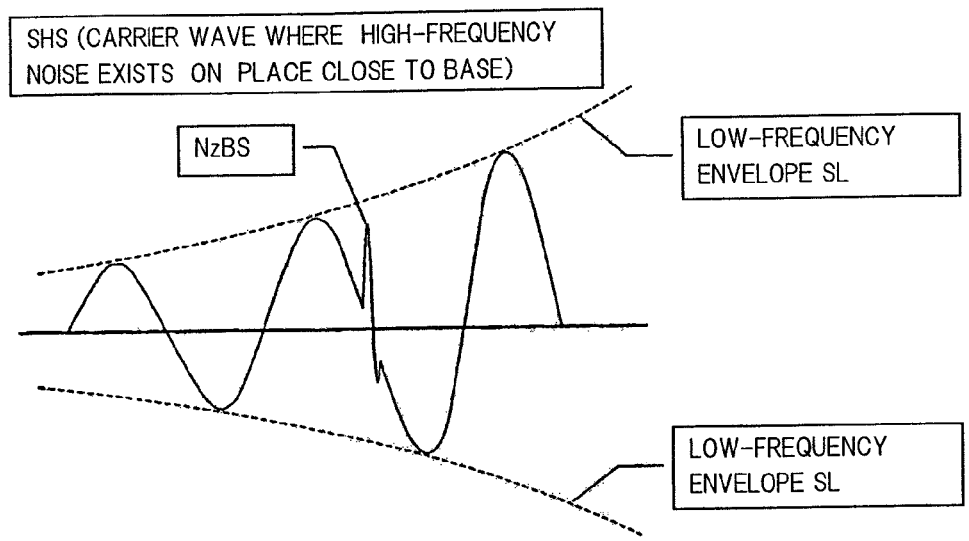
FIG. 8 is a diagram illustrating a waveform of a carrier wave in a state where high-frequency noises exist on a place close to a base of a waveform.
Figure 9:
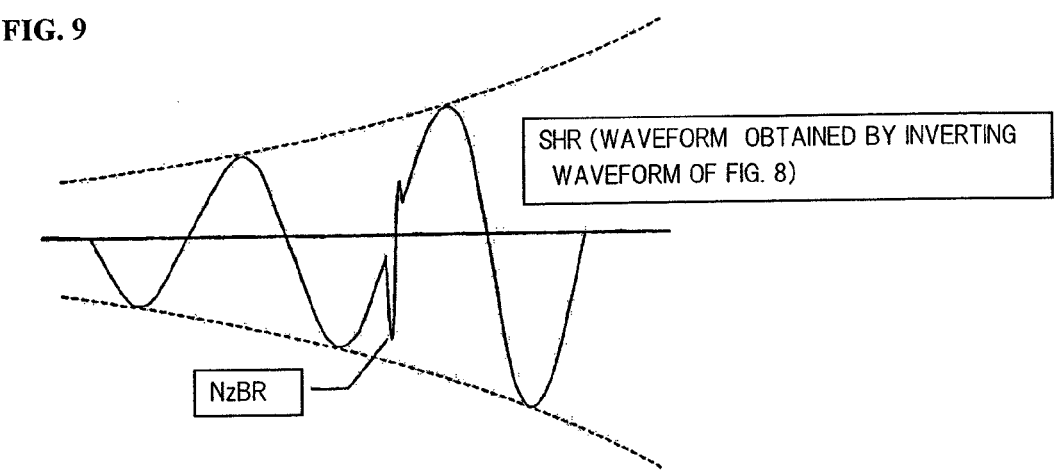
FIG. 9 is a diagram illustrating a state where the waveform of FIG. 8 is inverted.

In this stage, the waveforms of the high-frequency noises that are mixed as illustrated in FIGS. 8 and 9 are inverted with the same waveforms as denoted by reference characters NzBS and NzBR and displayed.

Next, the output signals are secondarily amplified. At this time, however, the output signals are amplified under the condition where a phase difference related to the tuning frequency SH is not generated. However, one output signal, for example, the output signal SHR only is amplified by an amplifying method where gain of a high-frequency region is slightly low.

Figure 10:
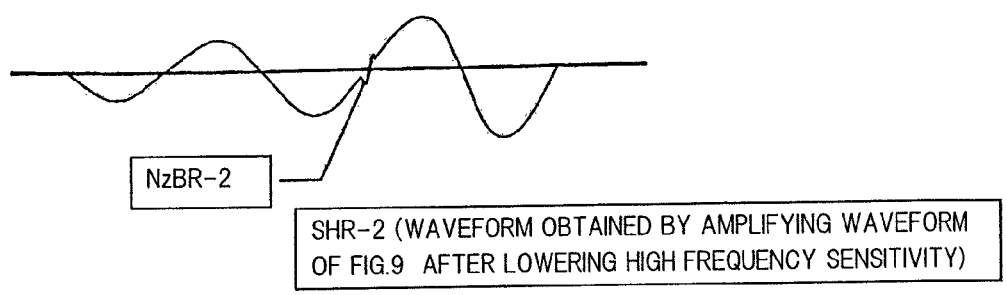
FIG. 10 is a diagram illustrating a waveform that is obtained by amplifying the waveform illustrated in FIG. 9 after lowering high frequency sensitivity.
Figure 13:
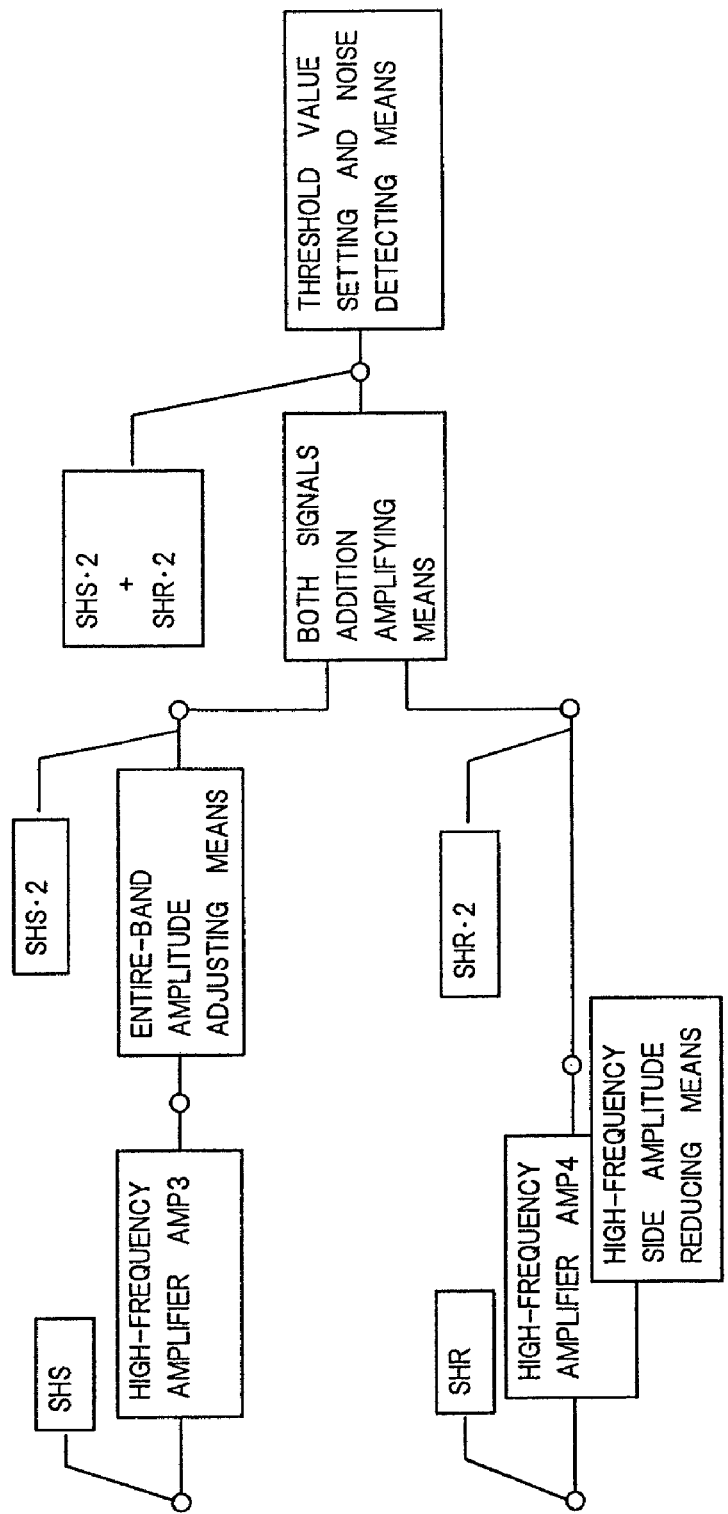
FIG. 13 is a block diagram illustrating an apparatus that constitutes a first embodiment of the present invention.

Specifically, a circuit illustrated in FIG. 13 is configured, and the output signal SHS is secondarily amplified by a high-frequency amplifier AMP3 of a relatively wide band and the output signal SHR is secondarily amplified by an amplifier AMP4 for which high-frequency side amplitude reducing means is taken. In this case, since the AMP4 has small gain in the high-frequency region, amplitude of an output SHR-2 thereof decreases as a whole as illustrated in FIG. 10. However, since the high-frequency noise NzB has a frequency higher than that of the carrier waves SH, the amplitude of the noise NzB further decreases (NzBR-2).

Figure 11:
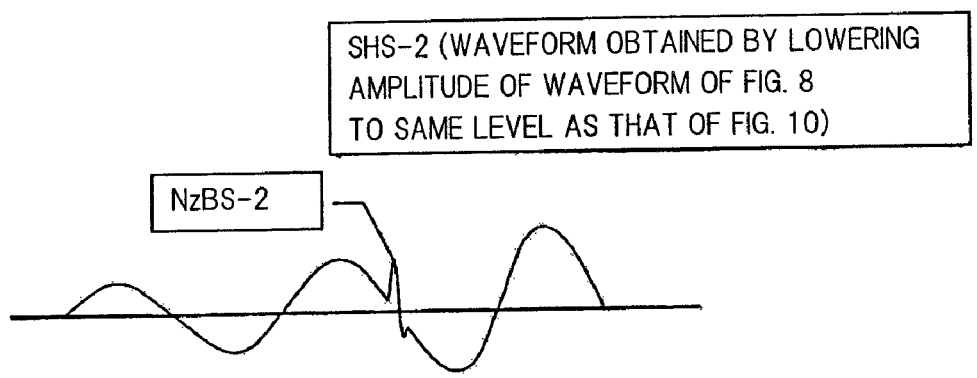
FIG. 11 is a diagram illustrating a waveform that is obtained by lowering amplitude of the waveform illustrated in FIG. 8 to the same level as the waveform illustrated in FIG. 10.

The other output signal SHS is amplified by the amplifier AMP3 of the wide band. However, the output signal is output via amplitude adjusting means over an entire band, such that the amplitude of the output signal is adjusted to the same level as the SHR-2. The waveform SHS-2 thereof is as illustrated in FIG. 11 (NzBS-2).

In this way, the output levels of SHS-2 and SHR-2, that is, the amplitudes are adjusted. Then, as illustrated in FIG. 13, both of the output signals are added by addition amplifying means. The adjustment of the output levels can be simply performed by a variable resistor, but may be performed by a method in which the gain of the SHS side is lowered to the gain of the SHR side, at the time of the secondary amplification.

Figure 12:
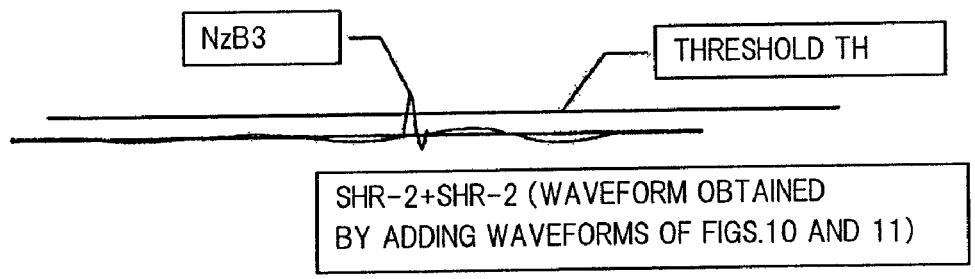
FIG. 12 is a diagram illustrating a waveform that is obtained by adding the waveforms illustrated in FIGS. 10 and 11.

FIG. 12 illustrates an example of the addition result of both of the signals. As described above, the carrier wave, that is, the tuning frequency portion is the inverted signal. Thus, the addition result basically becomes the zero amplitude. However, in the high-frequency noise NzB that is carried on the carrier waves, a clear difference remains, because the amplitude of the SHR side is small.

Accordingly, as illustrated in FIG. 12, if the difference is detected by the threshold (threshold value) TH having a constant level, even in the noise of the peak portion of the waveform of the carrier waves and the noise of the base portion, regardless of the generation time (received time) thereof, the noise having the same amplitude can be detected under the same condition (NzB3).

That is, according to the system in accordance with an aspect of the present invention, since only a high frequency amplification system is used without using the low frequency amplification for the sound used in the automatic separation and detection of the electromagnetic wave noises of the old invention, the unstable phase variation due to the frequency difference of the high frequency and the smoothened low frequency can be avoided, and the "dead zone" due to the amplitude difference between the high frequency and the low frequency is not generated. Therefore, the high-precision noise separation and detection can be achieved.

As can be naturally understood, the present invention can almost perfectly cancel the tuning frequency portion basically serving as the carrier waves, regardless of the magnitude of the low frequency modulation or the waveform, and can be effective in almost all bands including the AM modulation region.

In regards to the tuning circuit "TUNE" of the initial stage of FIG. 7 and the amplifying circuit "AMP1" of the initial stage, the most simple circuit configuration is illustrated for convenience of explanation. Various advanced circuits, such the common radio, can be used.

Second Embodiment

The above-described first embodiment is realized by using the method that uses the signal subtraction, specifically, generates inverted inverse phase signals and adds the signals by (1) amplifying the tuning frequency with the high frequency and separating the frequency into two systems, (2) independently amplifying the separated output waveforms of the two systems by the amplifiers having the different frequency characteristics, (3) adjusting the amplitudes and the phases of the tuning frequencies of the independently amplified outputs of the two systems, and (4) subtracting both of the signals and making the output of the tuning frequency portion become approximately zero.

Meanwhile, the second embodiment is realized by using a method that subtracts the signals having the same phase with the differential amplification.

That is, in the second embodiment, a tuning amplification mechanism configuration of the initial stage is the same as that of the first embodiment, and may be the same as the circuit configuration illustrated in FIG. 7 or the other tuning/amplifying circuit for the radio. However, in the second embodiment, since only SHS that is the regular output of the high-frequency amplifier AMP2 is used, the AMP2 does not need to be the amplifying mechanism having the inversion output. That is, only the regular output or the inversion output may be used.

Figure 14:
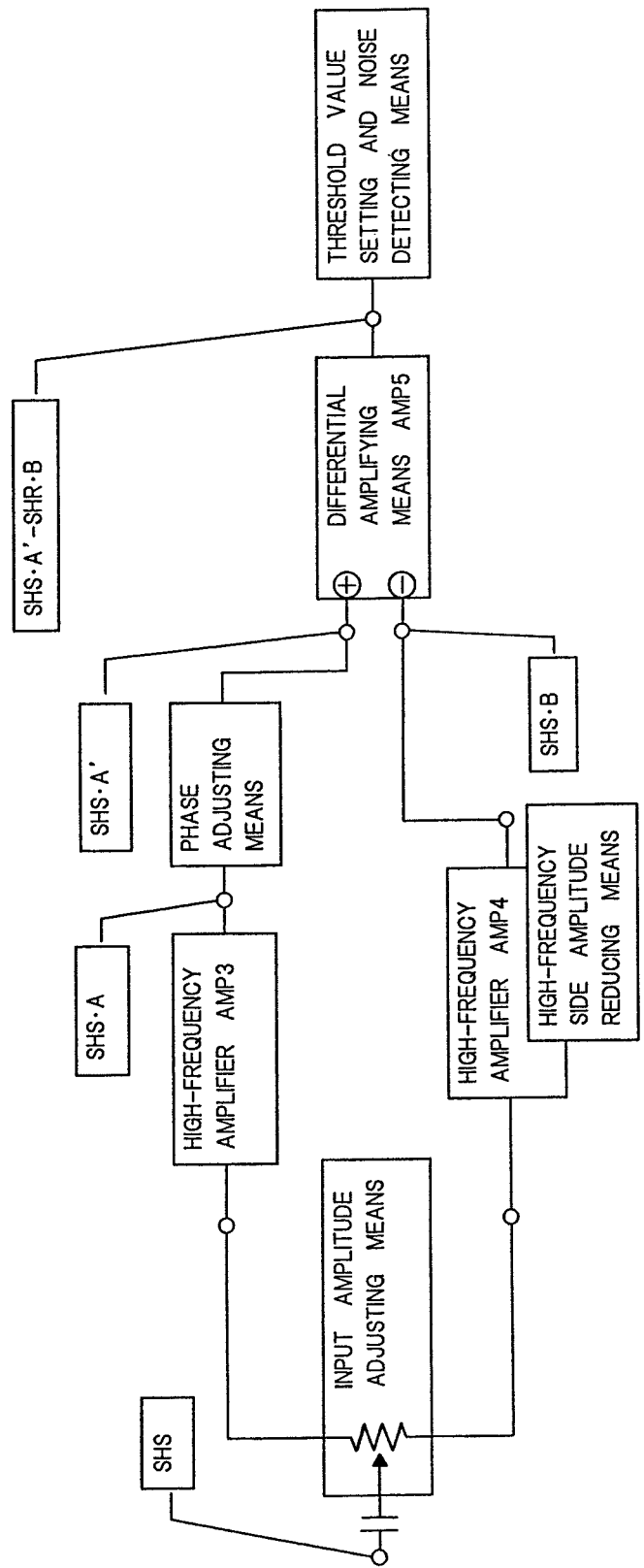
FIG. 14 is a block diagram illustrating an apparatus that constitutes a second embodiment of the present invention.
Figure 15:
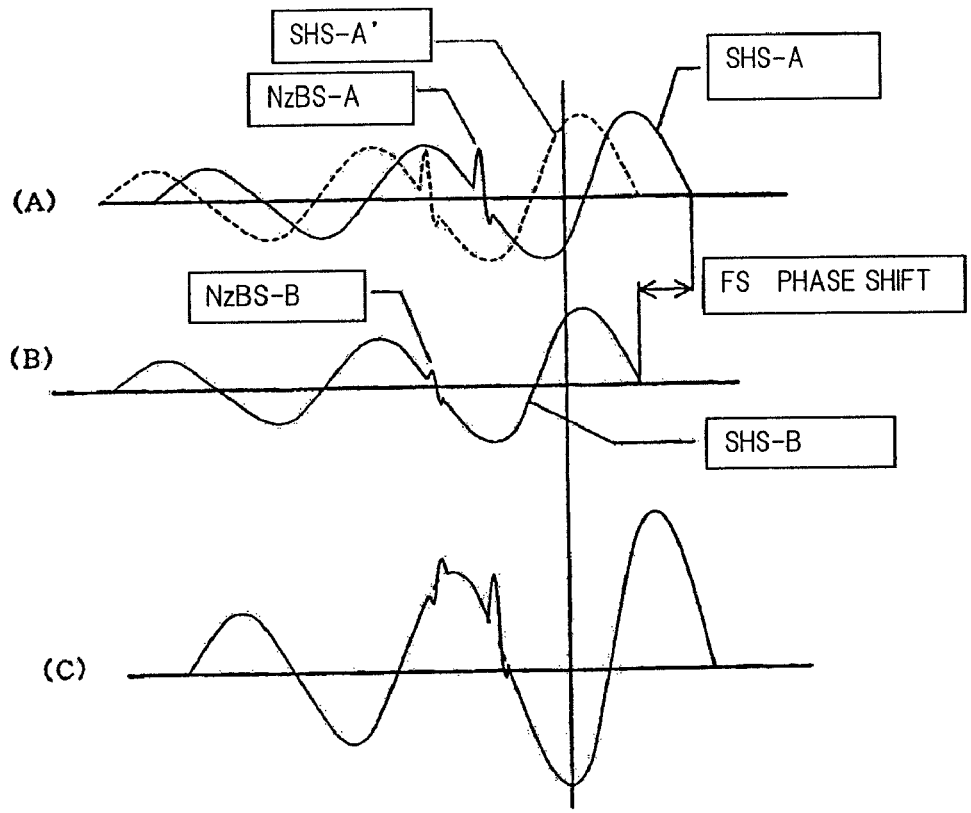
FIG. 15 is a diagram illustrating a shift relationship of a phase and a waveform in a state where the amplitude of the waveform illustrated in FIG. 8 is lowered to the same level as the waveform illustrated in FIG. 10.

When the output SHS is supplied to the high-frequency amplifiers of the two systems of the AMP3 and AMP4 as illustrated in FIG. 14, the output amplitude is reduced as a whole, because the AMP 4 has the high-frequency side amplitude reducing means. For this reason, input amplitude amplifying means is used in the side of the AMP4 such that the signal having the large amplitude is supplied. In this way, the outputs of the AMP3 and AMP4 have almost the same amplitude with respect to the basic tuning frequency SHS, and the outputs SHS-A and SHS-B are obtained. In this case, as illustrated in FIG. 15, only the noise portions appear as having the different magnification like the NzBS-A and NzBS-B.

The input signal of the AMP3 side and the input signal of the AMP4 side have the same phase. When the high-frequency side amplification reducing means such as the low-pass filer is used in the AMP4, the phase shift FS may be generated with respect to the basic tuning frequency, as illustrated in FIG. 15.

Figure 16:
FIG. 16 is a diagram illustrating a waveform in a state where a discontinued waveform of FIG. 15 is subtracted from a waveform of a dotted line of an upper stage of FIG. 15.

In this case, if both of the signals are differentially amplified without correcting the phase shift, as illustrated in FIG. 15C, the tuning frequency portions may be increased without the mutual cancellation. In this case, as illustrated in FIG. 14, the configuration where the phase adjusting mechanism is provided at the rear stage of the AMP3 or AMP4 and the phases are adjusted to be the same may be effective. If the phase corrected waveforms SHS-A' and SHS-B illustrated in FIG. 15A are subtracted, the remaining amplitude of the carrier waves portion greatly decreases as illustrated in FIG. 16. If the phase shift is corrected to 6° or less, the remaining amplitude of the carrier waves portion decreases to approximately 10% or less of the original amplitude. Therefore, if the appropriate threshold TH is set, the noise can be securely detected.

As a result, if the input signals SHS-A' and SHS-B that have the phases and amplitudes of both systems are supplied to differential amplifying means AMP5 of FIG. 14, the basic tuning frequency portions are mutually cancelled and become almost zero. As illustrated in FIG. 16, only the noise portion NzB3 is extracted, and the threshold value (threshold) TH of the noise portion is set and arbitrary information processing such as the detecting, recording, and counting is enabled. The plural threshold values of two steps or more are set and classification and counting based on the magnification of the noise amplitude are enabled. A method that shapes the nose waveform into the constant pulse shape for the digital processing and facilitates the information processing is also considered.

As a method that differentiates the frequency characteristic of any system, a method that reduces the amplitude of the high frequency portion by a combination of amplification function elements is used. However, a method that uses the different high-frequency region characteristics of the amplification function elements is also used. For example, with respect to a transition frequency (gain-bandwidth product) that is called a limiting frequency of an amplification factor of a transistor, an element having a high transition frequency may be used in the SHS side to correspond to a wideband frequency, an element having a low transition frequency may be used in the SHR side to reduce the amplitude of the high frequency side, the other circuit elements may be configured to have the same transition frequency, and the phase shift of the SHS side and the SHR side may be minimized.

A specific example is described. In this case, the basic tuning frequency of 500 kHz is taken at the low band side of the AM broadcasting region of the medium wave band, an element QA having a transition frequency of 400 MHz and an element QB having a transition frequency of 50 MHz are used, and a current amplification factor is 100 in both cases. Since the transition frequency corresponds to a product of the amplification factor and the use frequency, the amplification factor is 10 at the frequency of 400 MHz in the case of the element QA. Meanwhile, in the case of the element QB, the amplification factor is only 1.25 at the frequency of 40 MHz. Therefore, the high frequency characteristic is lowered. With respect to the basic tuning frequency of 500 kHz, the amplification factor is 100 in both cases, and the cancellation of the basic tuning frequency is performed without causing the problem. However, the amplification factor is 40 at the frequency of 10 MHz, and the amplification factors are 8 and 1 at the frequencies of 5 and 50 MHz, respectively. That is, since the amplification factors are different from each other at the different frequencies, the high-frequency noises are not mutually cancelled and are extracted.

However, even though the above configuration is used, the small amplitude may remain due to the slight phase shift. At this time, when the received amplitude of the original basic tuning frequency becomes doubled, the remaining amplitude becomes doubled. Accordingly, it is effective to change the level of the threshold TH according to the magnitude of the remaining amplitude.

Figure 17:
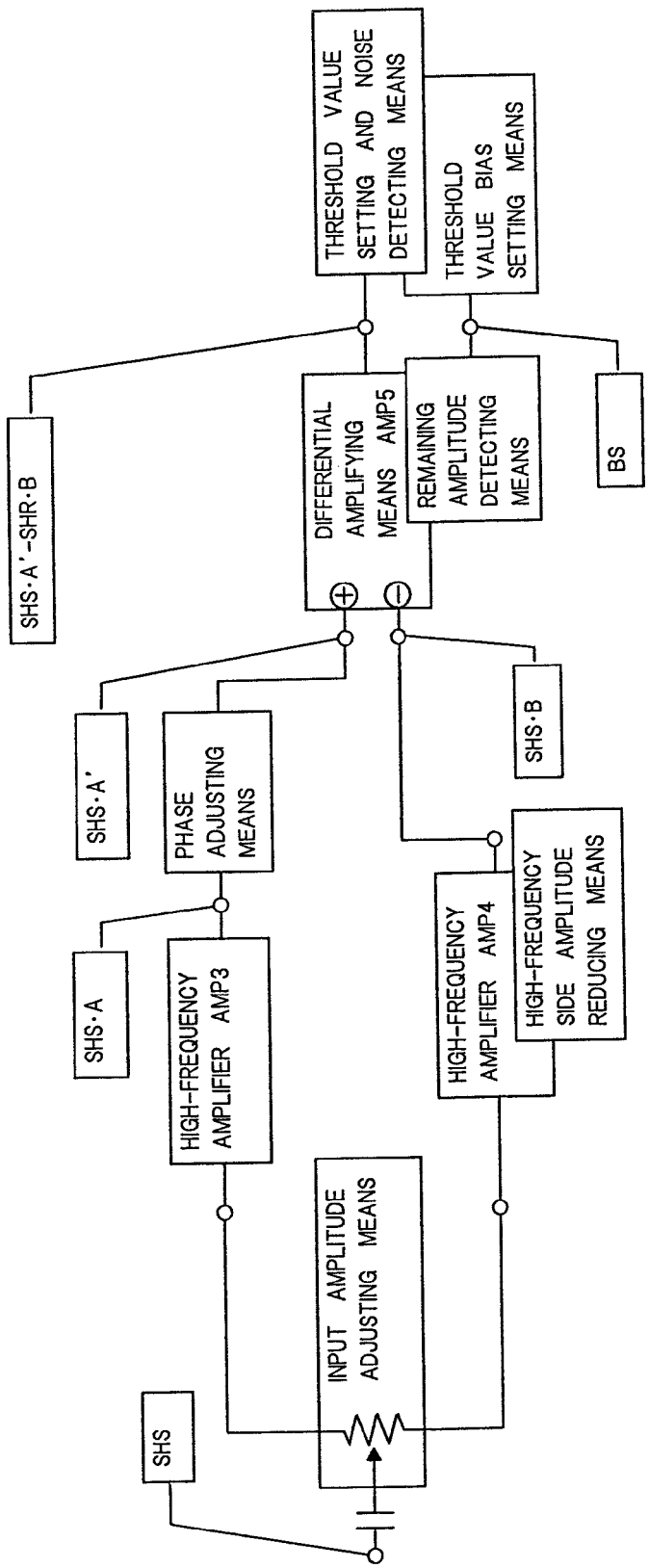
FIG. 17 is a block diagram illustrating a state where a threshold value bias setting means is provided in the circuit configuration illustrated in FIG. 14.

That is, as illustrated in FIG. 17, the remaining amplitude detecting means is added to the differential amplifying means AMP5 that subtracts the SHS-A' and SHS-B, and an obtained value is transmitted to threshold value setting and noise detecting means. In the threshold value setting and noise detecting means, threshold value bias setting means that automatically sets an appropriate reference level of the threshold value is provided, in addition to simple threshold value setting means.

As the threshold value bias setting means, a method that adds a value obtained by rectifying the waveform of the remaining amplitude or a value proportional to the value to the threshold value selected as the standard value is generally used. However, even though a method that adds the waveform before the rectification or the half-wave rectified waveform, or a value proportional to the value is used, the noise detection performance does not greatly change.

Third Embodiment

The above-described embodiments are related to the method for automatically separating and detecting the high-frequency noises by the cancellation of the regular signal and the inversion signal. However, in this embodiment, the noises are detected by the tuning frequency cancellation by the signals having the phase shift of 180°, instead of the inversion signal.

Figure 18:
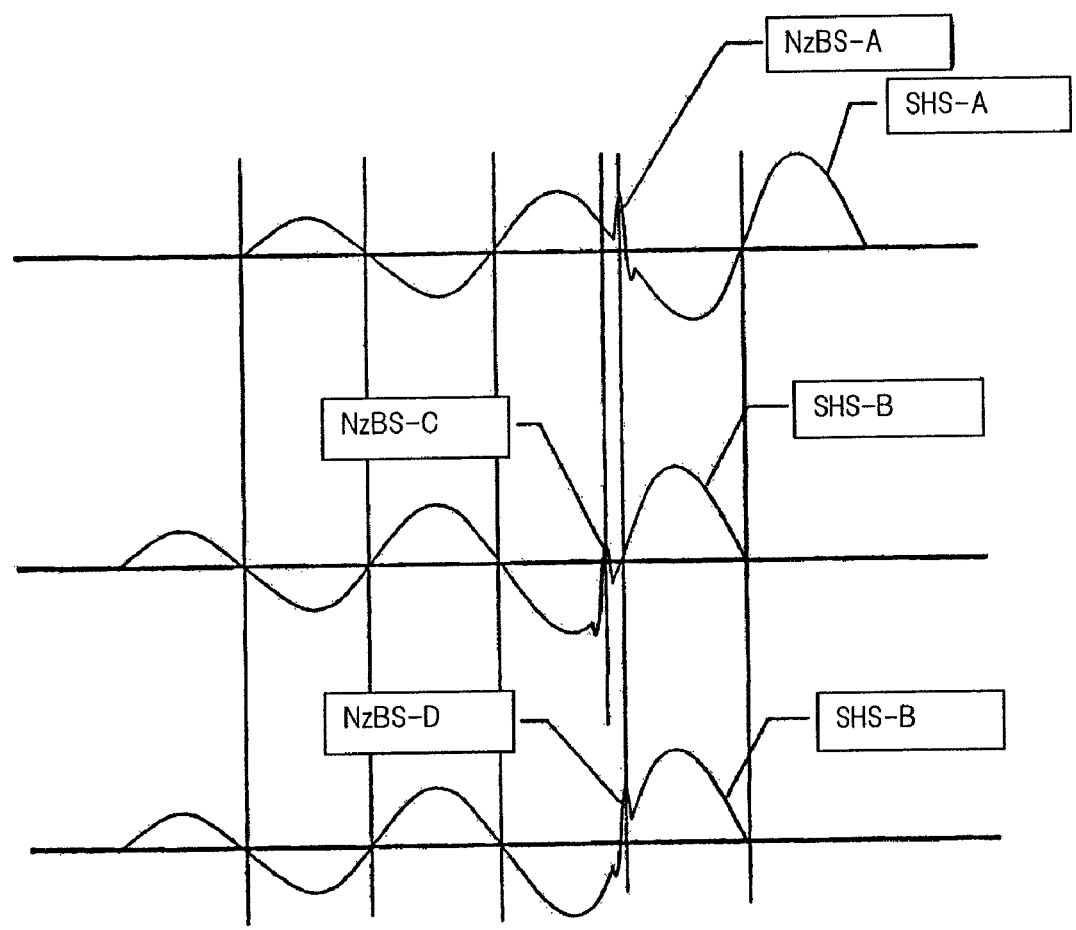
FIG. 18 is a diagram illustrating a third embodiment, which illustrates a waveform in a state where a phase is shifted by 180°.

In FIG. 18, if the phase of the SHS-A where the noise NzBs-A exists on the original regular signal waveform is delayed by 180°, the SHS-B is obtained.

If this is applied to the frequency band having the high phase shift, the high-frequency noise NIBS is also delayed by 180°. Therefore, 180° delay is generated in the waveform of the high-frequency noise like the NzBS-C. If it is assumed that the phase shift is not generated in the high frequency component, the signal remains with the same phase as the NzBS-A like NzBS-D.

In this case, if the SHS-A and the SHS-B having the 180° phase shift from the SHS-A are added, almost zero amplitude is obtained with respect to the basic tuning frequency. However, in the case of the NzBS-C, the NzBS-A and the NzBS-C become remain as the waveforms of two mountain shapes without being cancelled. In the case of the NzBS-D, since the NzBS-D is added to the NzBS-A, the noise waveform of one mountain shape where the amplitude is doubled appears. That is, in all cases, since the noise remains without being removed, the noise is securely detected.

In general, since the high-frequency noise portion becomes have the intermediate phase shift of the phase shift of 180° and the phase shift of 0° (phase shift is zero), the high-frequency noise portion becomes a synthesized waveform that has amplitude larger than the amplitude of the NzBS-A and remains. Therefore, according to this system, the cancellation of the basic tuning frequency and the emphasis of the noise waveform are performed. This system becomes effective means in the automatic separation and detection of the electromagnetic wave noise in the natural world.

In this embodiment, since the phase shift of both of the signals may be 180°, any one of both of the signals may be advanced by 180° or the SHS-A may be advanced by 90° and the SHS-B may be delayed by 90°.

Figure 19:
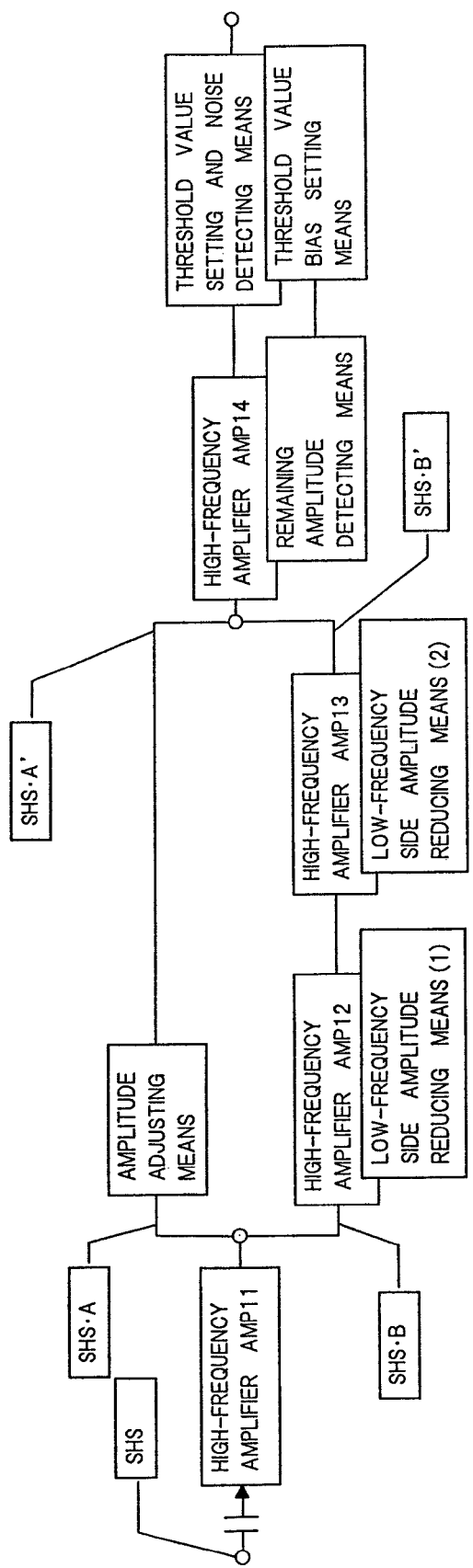
FIG. 19 is a block diagram of an apparatus that shifts a phase of a waveform SHS-B by 180°.

In order to generate the phase shift of 180°, a plural signal processing methods may be used. For example, as illustrated in FIG. 19, any of the two signals SHS-A and SHS-B that are branched from the received signal SHS of the initial stage may be passed through a high-pass filter over the plural stages.

Figure 20:
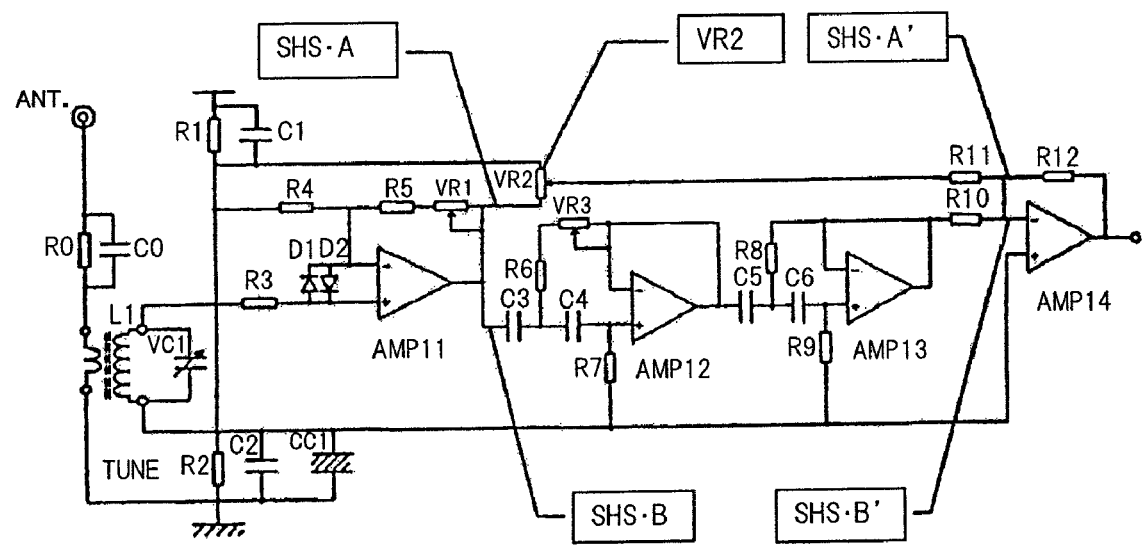
FIG. 20 is a diagram illustrating an example of the circuit configuration of the apparatus that shifts the phase of the waveform SHS-B by 180°.

Since the amplitude of the SHS-B' changes after generation of the phase shift, the amplitude adjusting means is provided at the side of the SHS-A, such that the amplitude of the SHS-A' becomes matched with the amplitude of the SHS-B'. FIG. 20 illustrates an example of the specific circuit configuration to realize the above means. In the drawing, AMP12 and AMP13 indicate the low-frequency side amplitude reducing means and VR2 indicates amplitude adjusting means.

However, if the waveform of the basic tuning frequency is not modulated and the SHS-A' and SHS-B' having the phase shift of 180° are added, the basic tuning frequency portion can be perfectly cancelled. However, in the case of the waveform that is subjected to the AM modulation, the slight difference due to shift of the low-frequency envelope remains.

However, even in the bad condition where the carrier wave of 600 kHz is 100% modulated at 10 kHz, the waveform generated due to the difference, that is, the remaining waveform having small amplitude is only 5.3% or less of the amplitude of the basic tuning frequency. Therefore, the waveform does not affect the separation and the detection of the noise.

Of course, as illustrated in the second embodiment, in the threshold value setting and noise detecting means after the cancellation, it is effective to provide automatic setting of the bias of the threshold by the remaining amplitude detection illustrated below the AMP14 of FIG. 19.

According to an aspect of the present invention, the present invention is used as means for predicting the generation of the earthquakes by detecting the noises, when underground distortion energy generated as premonitory symptom of the generation of the earthquakes is discharged as the electromagnetic waves and the electromagnetic waves generated in the natural world acts the noises with respect to the carrier wave having the predetermined frequency. Since both of the natural noise and the artificial noise can be detected, the present invention can specify the generation pattern and generation time of the noise and specify the noise generation source, and can be used in a general industry field.

The invention claimed is:

1. An apparatus for automatically separating and detecting noise radio waves, the apparatus comprising:
   bidirectional amplifying means that detects noise signals having amplitude exceeding a set threshold value from the noise signals extracted from radio waves having a specific frequency, records the noise signals or counts the noise signals, and applies received high-frequency radio waves and obtains output signals of two systems having inverted phases;
   amplitude adjusting means that adjusts amplitudes of the signals of the two systems obtained by the bidirectional amplifying means; and
   signal synthesizing means that adds the signals of the two systems after the amplitude adjustment and obtains a synthesized output signal,
   wherein the signal synthesizing means cancels the input signals to become an output having almost zero amplitude, regardless of whether the input signals are modulated with a low frequency, differentiates a frequency characteristic of the signal of one system of the two systems from a frequency characteristic of the other system, makes the noise radio waves at the side of a frequency higher than frequencies of the high-frequency radio waves remain without being canceled, and extracts the noise radio waves.

2. The apparatus for automatically separating and detecting noise radio waves, the apparatus further comprising:
   first amplifying means that detects noise signals having amplitude exceeding a set threshold value from the noise signals extracted from radio waves having a specific frequency, records the noise signals or counts the noise signals, and applies received high-frequency radio waves and performs high-frequency amplification;
   an output separating mechanism that separates an output from the first amplifying means into independent output signals of two systems having the same phase;
   amplitude adjusting means that adjusts amplitudes of the output signals of the two systems output from the output separating mechanism;
   a differential amplifying mechanism that applies the signal of one system to a positive input and the signal of the other system to a negative input and amplifies the signals; and
   signal re-synthesizing means that cancels the input signals to become an output having almost zero amplitude, regardless of whether the input signals are modulated with a low frequency, after the differential amplification,
   wherein the signal re-synthesizing means differentiates a frequency characteristic of the signal of one system of the two systems from a frequency characteristic of the other system, and makes the noise radio waves at the side of a frequency higher than frequencies of basic input signal waves remain without being canceled.

3. The apparatus for automatically separating and detecting noise radio waves, the apparatus further comprising:
   first amplifying means that detects noise signals having amplitude exceeding a set threshold value from the noise signals extracted from radio waves having a specific frequency, records the noise signals or counts the noise signals, and applies received high-frequency radio waves and performs high-frequency amplification;
   an output separating mechanism that separates an output from the first amplifying means into independent output signals of two systems having the same phase;
   phase processing means that differentiates phases of the output signals of the two systems output from the output separating mechanism by about 180°;
   amplitude adjusting means that adjusts amplitudes of the output signals of the two systems; and
   a signal adding mechanism that adds the output signals of the two systems after the phase processing and the amplitude adjusting,
   wherein the signals of the two systems having the different phases are added, the input signals are cancelled to become an output having almost zero amplitude, regardless of whether the input signals are modulated with a low frequency, and the noise radio waves at the side of a frequency higher than frequencies of basic input signal waves remain without being canceled.

4. The apparatus according to any one of claims 1 to 3, further comprising:
  phase correcting means that corrects a phase shift, when the frequency characteristic of the signal of one system of the two systems is differentiated from the frequency characteristic of the signal of the other system and the phases of the basic frequencies of the two systems are shifted.

5. The apparatus according to any one of claims 1 to 3, wherein homogeneous amplification function elements having different transition frequencies are used as means for differentiating the frequency characteristic of the signal of one system of the two systems from the frequency characteristic of the signal of the other system, to differentiate amplification factor characteristics of high-frequency regions.

6. The apparatus according to any one of claims 1 to 3, further comprising:
  remaining output detecting means that cancels the signals of the two systems to become an output having almost zero amplitude, and detects remaining amplitude after the cancellation; and
  threshold value adjusting means that automatically sets a bias level of a threshold value according to a remaining output value,
  wherein the threshold value appropriate for the remaining amplitude is set.

7. The apparatus according to claim 4:
  wherein homogeneous amplification function elements having different transition frequencies are used as means for differentiating the frequency characteristic of the signal of one system of the two systems from the frequency characteristic of the signal of the other system, to differentiate amplification factor characteristics of high-frequency regions.

8. The apparatus according to claim 5, further comprising:
  remaining output detecting means that cancels the signals of the two systems to become an output having almost zero amplitude, and detects remaining amplitude after the cancellation; and
  threshold value adjusting means that automatically sets a bias level of a threshold value according to a remaining output value,
  wherein the threshold value appropriate for the remaining amplitude is set.

9. The apparatus according to claim 5, further comprising:
  remaining output detecting means that cancels the signals of the two systems to become an output having almost zero amplitude, and detects remaining amplitude after the cancellation; and
  threshold value adjusting means that automatically sets a bias level of a threshold value according to a remaining output value,
  wherein the threshold value appropriate for the remaining amplitude is set.

* * * * *